United States Patent [19]

Matsuura et al.

[11] Patent Number: 4,887,567
[45] Date of Patent: Dec. 19, 1989

[54] CONNECTING ARRANGEMENT IN VALVE OPERATING SYSTEM FOR INTERNAL COMBUSTION ENGINE

[75] Inventors: Masaaki Matsuura; Masaharu Nakamori; Masahiro Kuroki; Mitsuru Ishikawa, all of Saitama, Japan

[73] Assignee: Honda Giken Kogyo Kabushiki Kaisha, Tokyo, Japan

[21] Appl. No.: 235,821

[22] Filed: Aug. 18, 1988

Related U.S. Application Data

[62] Division of Ser. No. 945,661, filed as PCT JP86/00177 on Apr. 10, 1986, published as WO86/06135 on Oct. 23, 1986, abandoned.

[30] Foreign Application Priority Data

Apr. 10, 1985 [JP] Japan ................................ 60-74516
Sep. 30, 1985 [JP] Japan ............................... 60-216384
Sep. 30, 1985 [JP] Japan ............................... 60-216386

[51] Int. Cl.$^4$ ............................................. F01L 7/10
[52] U.S. Cl. ........................... 123/190 D; 123/190 A; 464/105
[58] Field of Search ........ 123/190 R, 190 A, 190 BD, 123/80 D, 80 BA, 190 D; 464/102, 105

[56] References Cited

U.S. PATENT DOCUMENTS

| 1,316,011 | 9/1919 | Bailey et al. | 464/105 |
| 1,352,953 | 9/1920 | Grundy | 464/105 |
| 1,361,236 | 12/1920 | Elliot | 123/190 A |
| 1,459,035 | 6/1923 | Raisig | 464/105 |
| 1,887,081 | 11/1932 | Buetell | 464/105 |
| 3,730,161 | 5/1973 | Deane | 123/190 D |
| 3,789,627 | 2/1974 | Smith | 464/105 |

FOREIGN PATENT DOCUMENTS

| 792678 | 1/1936 | France | 123/190 A |
| 74126 | 5/1983 | Japan | 123/190 BD |
| 0075132 | 4/1987 | Japan | 464/102 |
| 138904 | 5/1921 | United Kingdom | 123/190 A |

Primary Examiner—Willis R. Wolfe
Assistant Examiner—M. Macy
Attorney, Agent, or Firm—Lyon & Lyon

[57] ABSTRACT

Intake and exhaust rotary valves (10, 10', 20; 110, 110', 120; 210, 210') are separately disposed in intake and exhaust passages (7, 7', 8, 8'; 107, 108) communicating with a combustion chamber (6; 106) in an internal combustion engine (1; 101), respectively, and are adapted to open and close the corresponding intake and exhaust passages. These rotary valves have spherical valve bodies (13, 13', 23; 113, 113', 123; 213, 213'). A valve operating system (30) for rotatively driving the valve bodies interlockingly with the movement of a piston (5; 105) in the internal combustion engine (1; 101) has drive shaft (34, 36; 134; 234) each of which is connected to the valve body through a connecting member (17, 18; 117, 118; 217, 218). In case a plurality of the intake and exhaust rotary valves are mounted, the valve bodies of the intake rotary valves as well as the valve bodies of the exhaust rotary valves are also interconnected through connecting members.

4 Claims, 5 Drawing Sheets

CONNECTING ARRANGEMENT IN VALVE OPERATING SYSTEM FOR INTERNAL COMBUSTION ENGINE

This application is a division, of application Ser. No. 945,661, filed as PCT JP86/00177 on Apr. 10, 1986, published as WO86/06135 on Oct. 23, 1986, now abandoned.

TECHNICAL FIELD

The present invention relates to a connecting arrangement for use in a valve operating system for an internal combustion engine.

TECHNICAL SUBJECT

In general, in an internal combustion engine including rotary valves carried therein and each having a spherical valve body, the spherical valve bodies of the rotary valves are disposed in intake and exhaust passages at their opening ends close to a combustion chamber, so that the opening and closing of the intake and exhaust passages are carried out by rotating these valve bodies. The valve bodies are integrally secured to the drive shafts of a valve operating system respectively and designed to be rotated by the rotation of the drive shafts.

However, in assembling the valve bodies of the rotary valves into intake and exhaust passages in a cylinder head, if the valve bodies have been integrally secured to the drive shafts as described above, the drive shafts get into the way and hence, the valve bodies are difficult to readily be assembled in place.

With the engine of the above construction, a run out during rotation due to: a thermal strain produced in the valve bodies by the heat from the combustion chamber in the engine; a misalignment between the drive shafts and the valve bodies in the fabricating step; and a processing error of recesses provided in the cylinder head for containing the valve bodies cannot be absorbed by the rotary valves themselves, resulting in a degraded sealing property and in an uneven wearing of the valve bodies and valve seat members for carrying the valve bodies slidably, thereby substantially reducing the performance and durability of the rotary valves, which is disadvantageous.

DISCLOSURE OF THE INVENTION

The present invention has been accomplished with the foregoing in view and it is an object of the present invention to provide a connecting arrangement in a valve operating system for an internal combustion engine, wherein spherical valve bodies of rotary valves can be readily assembled into intake and exhaust passages of a cylinder head, and a run out during rotation of the valve bodies due to the thermal strain produced in the valve bodies by the heat from a combustion chamber of the engine and due to the misalignment between drive shafts and the valve bodies can be absorbed to enhance the sealing property of the valve bodies, while preventing the uneven wearing of the valve bodies and valve seat members to improve the performance and durability of the rotary valves.

To accomplish the above object, according to the present invention, there is provided a connecting arrangement in a valve operating system in an internal combustion engine, comprising a rotary valve for controlling the communication of a combustion chamber with a passage permitting either the supply of a mixed gas or the discharge of an exhaust gas by the turning movement of a spherical body, and a valve operating mechanism for driving the rotary valve interlockingly with the movement of a piston, wherein the valve body of the rotary valve and a drive shaft of the valve operating mechanism are interconnected through a separate connecting member for rotation in unison.

Further, according to the present invention, there is provided a connecting arrangement in a valve operating system in an internal combustion engine, comprising a plurality of rotary valves for controlling the communication of a combustion chamber with a plurality of passages each permitting either the supply of a mixed gas or the discharge of an exhaust gas by the turning movement of spherical bodies, respectively and a valve operating mechanism for driving the rotary valves interlockingly with the movement of a piston, wherein the plurality of valve bodies of the rotary valves and a drive shaft of the valve operating mechanism are interconnected through separate connecting members for rotation in unison.

With such arrangements, the spherical valve body of the rotary valve and the drive shaft of the valve operating mechanism are formed separately and therefore, in assembling the rotary valve into the intake or exhaust passage, the valve body of the rotary valve can be assembled into a cylinder head in such a state separated from the drive shaft of the valve operating mechanism. In addition, in mounting the plurality of rotary valves, the valve bodies of the rotary valves can be assembled to each other in the separated state. Thus, during assembling operation, the drive shafts and the valve bodies do not disturb assembling of their respective other components as in the prior art, leading to a considerably improved efficiency in assembling operation.

If the connecting member is constituted by an Oldham's coupling, a run out during rotation of the valve body due to a thermal strain produced in the valve body by the heat from the combustion chamber of the engine and a misalignment between the drive shaft and the valve body can be absorbed by the interposed Oldham's coupling thereby to enhance the sealing property of the rotary valve, while preventing the uneven wearing of the valve body and the valve seat member to improve the performance and durability of the rotary valve.

In addition to the above arrangement, if buffers are interposed between the connecting member and the valve body as well as the drive shaft, clearances between these components are filled with the buffers, and any shock load imposed on the connected portions by the rotational movement of the valve body of the rotary valve is effectively absorbed by the buffers. Accordingly, a material for forming the valve body may be selected from a wider range, and even if the valve body is made of a brittle material such as a ceramic, there is no fear that the problems of pitching due to a shock load and in its turn, breaking arise.

Still further, if the Oldham's coupling is constituted of a plurality of elements so that the relative movement between the two components connected by the Oldham's coupling may be absorbed by the elements, even when the axes of the valve bodies of the two rotary valves do not lie on the same straight line in a state they have been integrally connected by the Oldham's coupling, the elements of the Oldham's coupling effectively absorbs a run out during rotation due to this misalignment and hence, the sealing property of the rotary valve is improved. Also, if the Oldham's coupling is tightly connected with the valve body and the drive shaft to eliminate the clearance between the connected portions, any shock load cannot be produced, so that a material for the valve body may be selected from a wider range as in the above-described arrangement.

BRIEF DESCRIPTION OF THE DRAWINGS

FIG. 2 being an end view of a combustion chamber in the engine shown in FIG. 1; FIG. 3 being a sectional view taken along the line III—III of the FIG. 1; FIG. 4 being an exploded perspective view of a valve body of a rotary valve and a connecting member; and FIG. 5 being a schematic perspective view of a valve operating mechanism;

FIG. 7 being an exploded perspective view of a valve body of a rotary valve, an Olfham's coupling as a connecting member, and buffers interposed between both of these components; and FIG. 8 being a sectional view taken along the line VIII—VIII of FIG. 6; FIG. 10 being a view of the Oldham's coupling in the assembled state; and FIG. 11 being a sectional view of the valve bodies of the two rotary valves and the drive shaft of the valve operating mechanism which are integrally connected with each other through the Oldham's coupling.

BEST MODE FOR CARRYING OUT THE INVENTION

Figure 1:
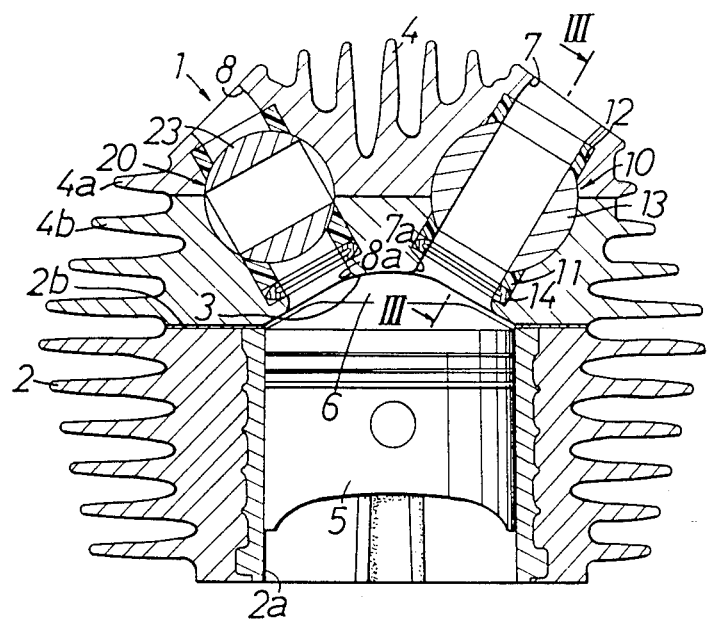
FIGS. 1 to 5 illustrate a first embodiment of the present invention, FIG. 1 being a vertical sectional view of an internal combustion engine according to this embodiment.
Figure 2:
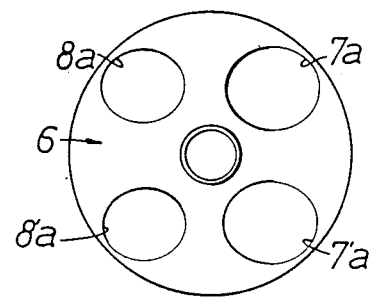

The present invention will now be described by way of several embodiments with reference to the accompanying drawings.

FIGS. 1 to 5 illustrate a first embodiment of the present invention. In these Figures, the reference character 1 designates an internal combustion engine which includes a cylinder block 2 formed with a cylinder 2a. A cylinder head upper half 4a and lower half 4b, which are overlaid on each other to constitute a cylinder head 4, are connected through a gasket 2b to the upper end of the cylinder block 2 by bolts or the like, the cylinder lower half 4b having a recess 3 defined therein in the opposed relation to the cylinder 2a. A piston 5 is slidably fitted in the cylinder 2a, and when the piston 5 is at an upper dead point, a combustion chamber 6 is defined by the upper end surface of the piston 5 and the recess 3. The cylinder head upper half 4a is provided with two intake passages 7 and 7' and two exhaust passages 8 and 8' (only ones shown in FIG. 1, respectively), and in the vicinity of the overlaid surfaces of the cylinder head upper and lower halves 4a and 4b, intake rotary valves 10 and 10' and exhaust rotary valves 20 and 20' which will be described hereinbelow are disposed respectively at places to permit the communication of the intake passages 7 and 7' and the exhaust passages 8 and 8' with the combustion chamber 6.

It should be noted that in this embodiment, the intake and exhaust passages have been illustrated as being provided by twos, but they are not intended to be limited thereto. In addition, the intake passages 7 and 7' and the exhaust passages 8 and 8' have been provided in the cylinder head 4 in an inclined fashion with respect to the axis of the cylinder 2a to extend away from each other as they go away from the combustion chamber 6, but they may also be provided in the cylinder head 4 with their axes parallel to the axis of the cylinder 2a.

Figure 3:
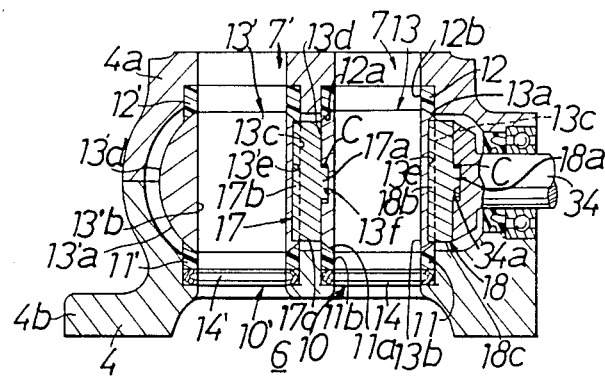

As shown in FIG. 3, one of the intake rotary valves 10 comprises an upper valve seat member 12 disposed on the cylinder head upper half 4a, a lower valve seat member 11 disposed on the cylinder head lower half 4b, a valve body 13 held between the valve seat members 12 and 11 and between the overlaid surfaces of the cylinder head upper and lower halves 4a and 4b, and a seal spring 14 interposed between the lower valve seat members 11 and the cylinder head lower half 4b for biasing the lower valve seat member 11 to hold the valve seat members 11 and 12 in contact. The valve seat members 11 and 12 are each disk-shaped and have spherical depressed valve seat surfaces 11a and 12a provided at opposed end surfaces thereof, respectively. The valve seat members are perforated, at their central portion, with holes 11b and 12b each having a diameter approximately equal to the inside diameter of the intake passage 7. Each of the valve seat members 11 and 12 is formed of a material having excellent heat and wear resistances, such as a ceramic material.

The valve body 13 is generally spherical, with its radius set at a value equal to the radius of curvature of the valve seat surfaces 11a and 12a, and the outer peripheral surface 13a of the valve body 13 is formed to come into close contact with the individual valve seat surfaces 11a and 12a. A bore 13b having a diameter approximately equal to the inside diameter of the intake passage 7 is perforated in the valve body 13 in one diametrical direction. The outer peripheral surface 13a of the valve body 13 is notched at two places on one diametrical line perpendicular to the axis of the bore 13b to form a pair of side walls 13c and 13d having circular flat surfaces parallel to each other. Recessed grooves 13e and 13f are diametrically made in the side walls 13c and 13d, respectively and lie with their phases displaced through 90° from each other. The rotary valve 10 shuts off the individual holes 11b and 12b in the valve seat members 11 and 12 by the outer peripheral surface 13a thereof when it is in the closed position, and permits the communication of the bore 13b in the valve body 13 with the individual holes 11b and 12b in the valve seat members 11 and 12 when it is in the opened position. For every rotation of the valve body 13 through 90°, the rotary valve 10 alternately assumes the closed and opened positions.

The other intake rotary valve 10' is constituted in the substantially same manner as the above-described one rotary valve 10, but it is different form the one rotary valve in that it does not have two side walls as the one rotary valve 10 has, and in that only at one end side of the valve body 13' in one diamerical direction perpendicular to the axis of the hole 13'b perforated in the valve body 13', the outer peripheral surface 13'a of the valve body 13' is notched to form a side wall 13'c providing a circular flat surface. The opposite end is not processed in any way and hence, provides a side wall 13'd forming a portion of the outer peripheral surface 13'a. A recessed groove 13'e is diametrically provided in the side wall 13'c. The above-mentioned three side walls 13c, 13d and 13'c are preferably formed into circular flat surfaces of the same diameter, respectively. The two valve bodies 13 and 13' are arranged in a row in the cylinder head 4 as shown in FIG. 3, so that the side wall 13d is opposed to the side wall 13'c of the valve body 13' at a predetermined distance, the both of the valve bodies being connected by a connecting member 17.

Figure 4:
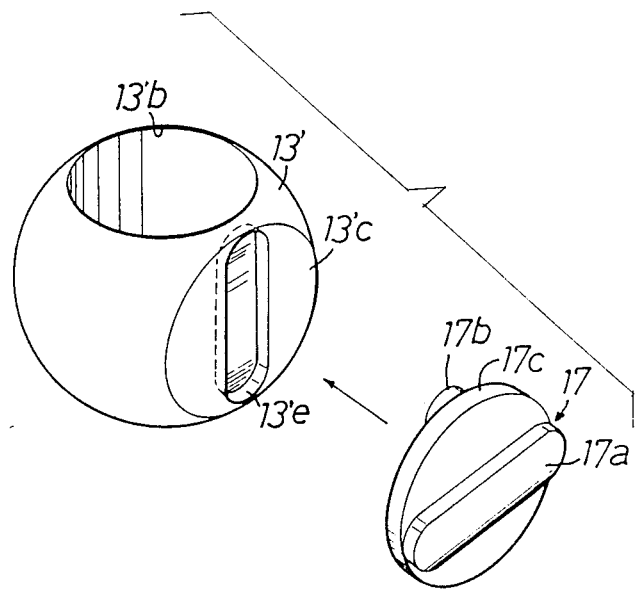

The connecting member 17 is formed of a disk member 17c having a diameter equal to that of the side wall 13'c of the valve body 13' (and the side wall 13d) and including protrusions 17a and 17b diametrically provided on the opposite end surfaces thereof, as shown in FIG. 4. In a short, an Oldaham's coupling is used. The protrusions 17a and 17b are disposed with their phases displaced through 90° from each other, and are sized such that they may be fitted with a slight clearance into the corresponding recessed grooves 13f and 13'e in the valve bodies 13 and 13'. The connecting member 17 is interposed between the valve bodies 13 and 13', as shown in FIG. 3, with one of the protrusions 17a being fitted in the recessed groove 13f in the side wall 13d of the valve body 13 and the other protrusion 17b being fitted in the recessed groove 13'e in the side wall 13'c of the valve body 13', thus coupling the two valve bodies 13 and 13' by a so-called Oldham's connection. This Oldham's connection permits a run out produced during rotation to be absorbed by the connecting member 17, even through the axes of the valve bodies 13 and 13' are slightly deviated from each other and do not lie on one straight line, and as a result, the valve bodies 13 and 13' are connected with a freedom in the three-dimensional relative movement, attendant with an improvement in close contact between the valve body 13, 13' and the corresponding valve seats 11 and 12; 11' and 12' and with a smoothness in rotation of the valve body 13, 13' between the valve seats. In addition, the uneven wearing of the valve bodies 13 and 13' and the valve seats 11, 12, 11' and 12' receiving the valve bodies can be prevented to provide an improvement in durability of the rotary valves 10 and 10'.

Figure 5:
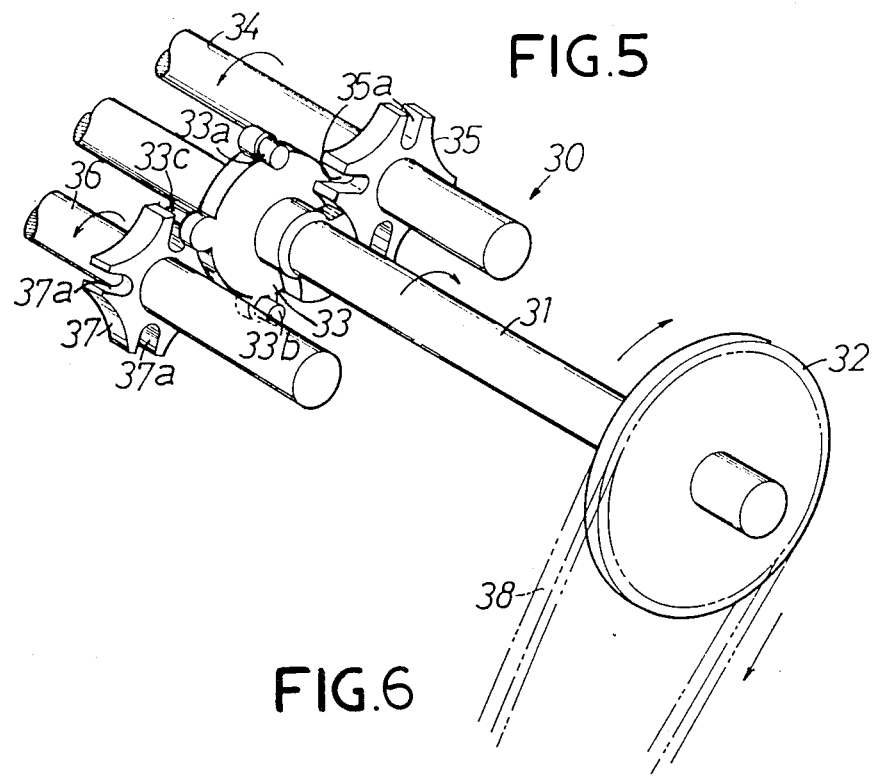

The valve body 13 of the one intake rotary valve 10 is further connected through another connecting member 18 to a drive shaft 34 of a valve operating mechanism 30 (FIG. 5). The connecting member 18 is constituted in the same manner as the connecting member 17. A protrusion 18a mounted on one end surface of a disk member 18c is fitted in a recessed groove 34a diametrically provided in one end surface of the drive shaft 34 and another recessed protrusion 18b mounted with its phase displaced through 90° from that of the protrusion 18a is fitted in a recessed groove 13e provided in the side wall 13c of the valve body 13 to couple the drive shaft 34 with the valve body 13 by an Oldham's connection. In this manner, the valve bodies 13 and 13' of the two intake rotary valves 10 and 10' are integrally connected to the drive shaft 34 through the connecting members 17 and 18.

With such construction, in assembling the rotary valves 10 and 10' into the cylinder head 4, the connecting member 17 is first clamped between the valve bodies 13 and 13', and in the state of the drive shaft separated, the valve bodies are installed between the corresponding openings in the intake passages 7 and 7' and the combustion chamber 6. Then, the connecting member 18 is interposed between the valve body 13 and the drive shaft 34, thus enabling the drive shaft 34 to be connected to the valve body 13. Therefore, the drive shaft of the valve operating mechanism cannot be a hindrance during assembling of the valve bodies as in the prior art, thus making it possible to extremely readily carry out the operation of assembling or disassembling them.

The twin exhaust rotary valves 20 and 20' disposed in the exhaust passages 8 and 8' are constituted in the same manner as the aforesaid intake rotary valves 10 and 10'.

FIG. 5 illustrates one example of a valve operating mechanism for driving these rotary valves. This valve operating mechanism 30 is constituted of, for example, a Genva stop mechanism. A sprocket 32 is secured to one end of a main shaft 31 rotatably journaled on the cylinder head 4 and is connected through a chain 38 to a sprocket secured to one end of a crank shaft (both not shown). The gear ratio of the sprocket 32 and the sprocket of the crank shaft is of 2:1, so that the main shaft 31 may be rotated in one rotation for every two rotation of the crank shaft. A drive wheel 33 is secured to the other end of the main shaft 31. An intake rotary valve opening pin 33a and closing pin 33b are embedded in the peripheral edge on one end surface of the drive wheel 33 at a distance spaced on the same circumference, and an exhaust rotary valve opening pin 33c and closing pin (not shown) are also embedded in the peripheral edge on the other end surface at a distance spaced on the same circumference.

The drive shafts 34 and 36 are rotatably journaled on the cylinder head 4 and have driven wheels 35 and 37 secured to one ends thereof, respectively. Four radical grooves 35a, 37a are provided in the driven wheel 35, 37 at intervals circumferentially spaced through 90°. The intake rotary valve opening pin 33a and closing pin 33b are adapted to successively engage the individual grooves 35a in the driven wheel 35 with the rotation thereof, and the exhaust rotary valve opening pin 33c and closing pin (not shown) are adapted to successively engage the individual grooves 37a in the driven wheel 37. The drive shaft 34 has the recessed groove 34a provided in the other end surface thereof and shown in FIG. 3, as described above. The groove 34a is engaged with the protrusion 18a of the connecting member 18. The drive shaft 36 is also integrally connected, at its one end close to the exhaust rotary valve, to the valve body of the exhaust rotary valve 20 through a connecting member (not shown) by the Oldham's connection in the same manner as the drive shaft 34.

Description will not be made of the operation of the above-mentioned first embodiment.

The main shaft 31 of the valve operating mechanism 30 is rotated in the clockwise direction as shown in FIG. 5 with the rotation of the crank shaft (not shown) to cause the driven wheel 35 to be rotated through 90° in the counter-clockwise direction for a period of time from the engagement of the pin 33a of the drive wheel in the selected groove 35a in the driven wheel 35 to the slipping-out of the pin 33a therefrom. With this rotation of the driven wheel 35, the valve bodies 13 and 13' of the intake rotary valves 10 and 10' are rotated through 90° in the counterclockwise direction in unison. The rotary valves 10 and 10' start to be opened from the instant when the pin 33a has engaged the groove 35a and is completely opened when the pin 33a has been slipped out of the groove 35a. The drive wheel 33 is further rotated to cause the driven wheel 35 to be rotated through 90° in the counterclockwise direction for a period of time from the instant when the pin 33b has engaged the next groove 35a in the driven wheel 35 to the instant when the pin 33b has been slipped out of such groove. With this rotation of the driven wheel 35, the valve bodies 13 and 13' are also rotated further through 90° in the counterclockwise direction. The intake rotary valves 10 and 10' start to be closed from the instant when the pin 33b has engaged the groove 35a and is completely closed when the pin 33b has been slipped out of the groove 35a. The rotary valves are held in the fully opened states for a predetermined period of time from the completion of such opening operation to the starting of the closing operation.

The drive wheel 33 is still further rotated to cause the driven wheel 35 to be further rotated through 90° in the counterclockwise direction for a period of time from the instant when the pin 33a has been fitted in the next groove 35a to the instant when the pin 33a has been slipped out of such groove, so that the rotary valves 10 and 10' are opened again therewith. The rotary valves 10 and 10' are held in the fully closed state for a predetermined period of time from the instant when the above-mentioned closing operation has been completed to the instant when the opening operation has been started. In this manner, upon rotation of the drive wheel 33 in the clockwise direction, the driven wheel 35 is intermittently rotated in the counterclockwise direction to provide the intemittent rotational driving of the drive shaft 34, so that the rotary valves 10 and 10'· are controlled in opening and closing therewith and stopped in the fully opened and closed positions for a predetermined period of time. The drive shaft is rotated in one rotation for every two rotations of the main shaft 31.

The exhaust rotary valves are controlled in opening and closing and stopped in the fully opened and closed positions in the same manner as in the intake rotary valves 10 and 10'. It is of course necessary that the intake and exhaust rotary valves are preset so that they may be controlled in opening and closing with a predetermined timing in accordance with an engine cycle.

The Genva stop mechanism has been described as being used as a valve operating mechanism in the present embodiment, but it should be understood that the valve mechanism is not limited thereto and for example, a cam type valve operating mechanism may be employed.

In addition, the means for driving the rotary valves has been described as being of the chain type for directly driving the rotary valves through the rotation of the crank shaft, but the means is not limited thereto and other means may be employed such as a step motor for electrically driving in accordance with the rotation of the crank shaft.

Since the connecting members are independently provided in the above arrangement, a run out during rotation of the rotary valves due to a thermal strain produced in the valve body due to the heat from the combustion chamber of the engine and due to the disalignment between the drive shafts or the valve bodies can be absorbed by the connecting members to provide an improvement in sealing property of the rotary valves, and the uneven wearing of the valve bodies and the individual valve seat members on which are slidably fitted the valve bodies can be prevented to provide an improvement in performance and durability of the rotary valves.

Figure 6:
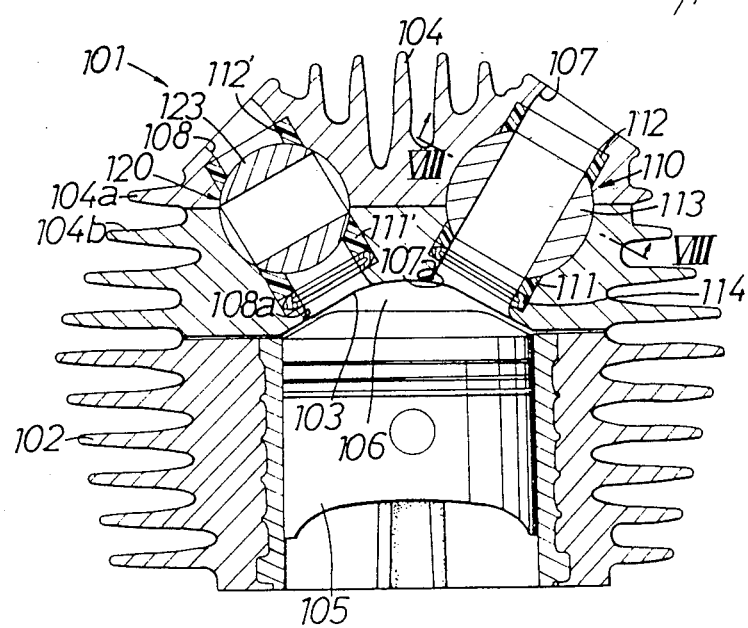
FIGS. 6 to 8 illustrate a second embodiment of the present invention, FIG. 6 being a vertical sectional view of an internal combustion engine according to this embodiment.

A second embodiment of the present invention will now be described with reference to FIGS. 6 to 8.

In this embodiment, the construction is such that buffers are interposed between the connecting member and the valve body of the rotary valve as well as the drive shaft. The arrangements other than the disposition of the buffers are completely identical with those in the foregoing first embodiment and hence, the description thereof is omitted.

Figure 7:
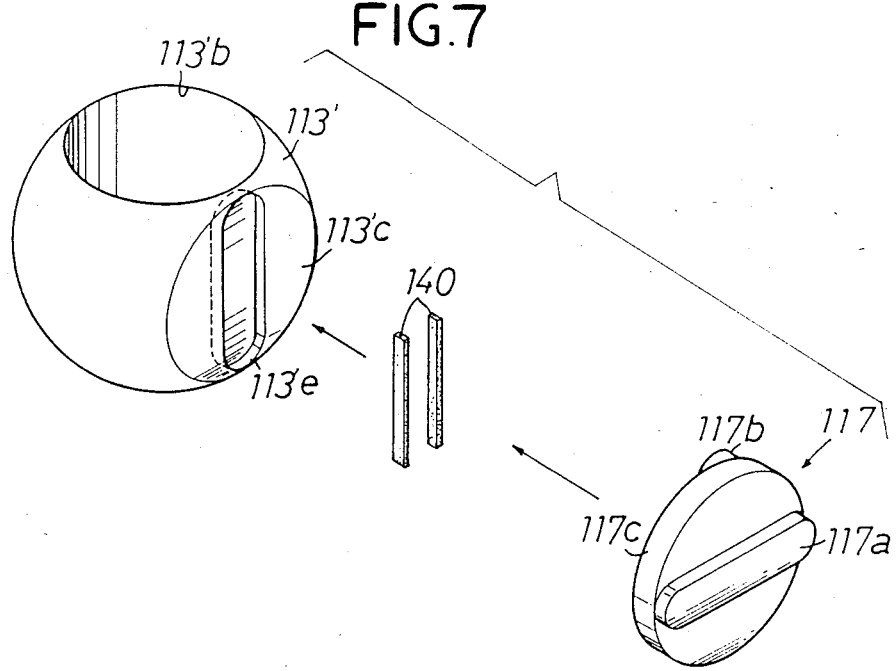
Figure 8:
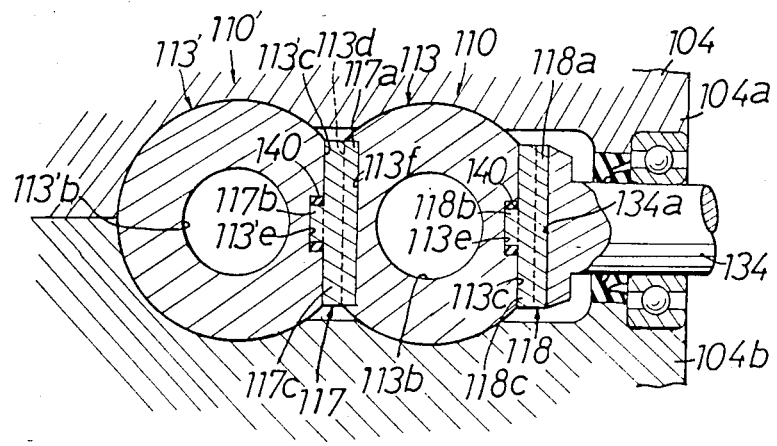

FIG. 7 shows an exploded perspective view of the connecting member, the buffers and the valve body according to this embodiment. The connecting member 117 consists of an Oldham's coupling as in the first embodiment, and protrusions 117a and 117b are diametrically mounted, with their phases displaced through 90° from each other, on the opposite end surfaces of the disk member 117c of the same diameter as the side walls 113d and 113'c of the valve bodies 113 and 113'. The buffer 140 is made of a material capable of absorbing a shock, such as an elastic synthetic resin or a rubber, and formed into a plate having a width and a length which are slightly smaller than those of the side portions of the protrusions 117a and 117b. Buffers 140 identical with the above buffers 140 are also mounted on a connecting member 118 for connecting the valve body 113 with the drive shaft 134. These buffers 140 and 140 are interposed respectively between the opposite side portions of the protrusions 117a, 117b, 118 and 118b and the opposite side portions of the recessed grooves 113'e, 113f, 113e and 134a. Therefore, in this embodiment, a clearance C between the respective engaged portions is set larger than that in the first embodiment so as to permit the interposition of such buffers.

It is to be noted that with the buffer 140 in the form of a plate made of a rubber, the buffers 140 may be previously secured by baking onto the side portions of the protrusions 117a, 117b, 118a and 118b or the side portions of the recessed grooves 113'e, 113f, 113e and 134a, respectively.

Thus, with this embodiment, the clearances C between the protrusions 117a, 117b, 118a and 118b and the recessed grooves 113'e, 113f, 113e and 134a are filled with the buffers 140, so that shock loads produced in the engaged portions by the rotational movement of the valve bodies 113 and 113' and the drive shaft 134 are absorbed by the buffers 140. Therefore, even if the valve bodies of the rotary valves are made of a brittle material such as a ceramic, problems of pitching due to shock loads and in its turn, breaking cannot arise.

Description will now be made of a third embodiment of the present invention with reference to FIGS. 9 to 11.

In this embodiment, only the constructions of a connecting member and recessed grooves provided in the valve body and the rotary shaft and permitting the fitting of such connecting member therein are different from those in the previous first embodiment. Other constructions are completely the same as in the first embodiment and hence, the description thereof is omitted.

Figure 9:
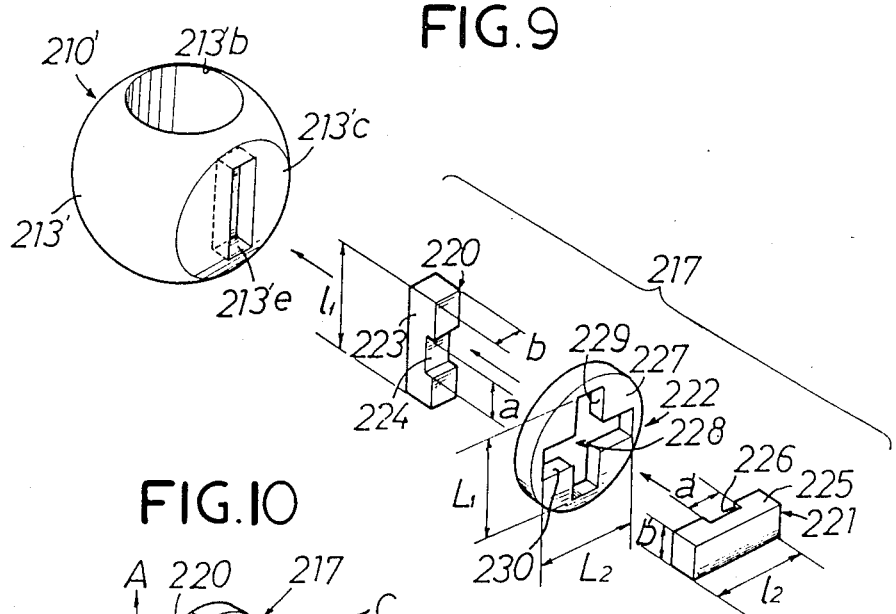
FIGS. 9 to 11 illustrate a third embodiment of the present invention, FIG. 9 being an exploded perspective view of a valve body of a rotary valve and an Oldham's coupling as a connecting member in this embodiment.

FIG. 9 shows an exploded perspective view of a connecting member 217 and a valve body 213' of one intake rotary valve 210. The connecting member 217 is constituted in the form of an Oldham's coupling capable of being disassembled into a plurality of components. The connecting member 217 consists of a first joint member 220, a second joint member 221 and a third joint member 222. The first joint member 220 is formed of a rectangular plate 223 which is rectangularly notched at one central side thereof to provide an engage groove 24. The second joint member 221 is formed of a rectangular plate 225 which is rectangularly notched at one central side to provide an engage groove 26. The opening dimension a of the engage groove 224 in the first joint member 220 is slightly larger than the dimension b in thickness of the second joint member 221, and the opening dimension a' of the engage groove 226 in the second joint member 221 is slightly larger than the dimension in thickness of the first joint member 220.

The third intermediate joint 222 is comprised of a disk 227 perforated at its central portion with a cross-shaped engage hole 228. The dimension L1 in length of one 229 of two hole portions constituting the engage hole 228 is larger than the dimension l1 in length of the first joint member 220, and the dimension L2 in length of the other hole portion 230 of the engage hole 228 is larger than the dimension l2 in length of the second joint member 221.

Figure 10:
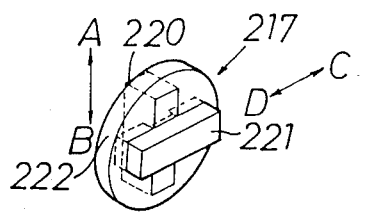

The first and second joint members 220 and 221 are crosswise bound in an intersected relationship at 90° to each other by bringing the engage holes 224 and 226 into engagement with each other and then, thus-bound joint members are engaged into the engage hole 228 in the third intermediate joint member 222, whereby the Oldham's coupling 217 is constituted as the connecting member as shown in FIG. 10. Consequently, the first joint member 220 is movable for a predetermined distance in the directions of arrows A-B in FIG. 10 within the one hole portion 229 of the engage hole 228 in the third intermediate joint member 222, and the second joint member 221 is movable for a predetermined distance in the directions of arrows C-D within the other hole portion 230 of the engage hole 228 in the second joint member 221, so that the movements of the first and second joint members enable the effective absorption of the relative displacements of the rotational axes of the valve bodies of the two rotary valves as well as of the drive shafts, which will be described hereinafter.

Figure 11:
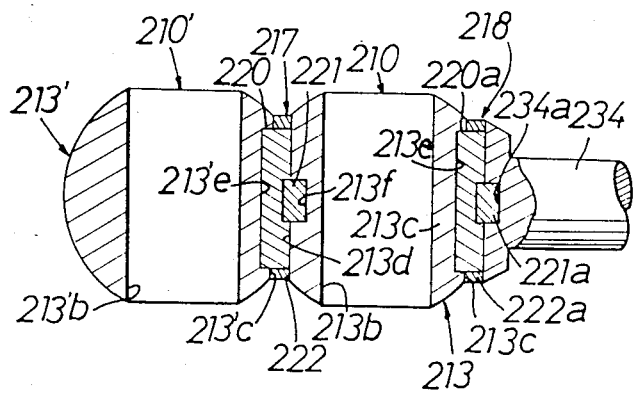

In FIGS. 9 and 11, the reference characters 213 and 213' designate the respective valve bodies of the two rotary valves 210 and 210'. One of the valve bodies 213 includes side walls 213d and 213c which have rectangular recessed grooves 213f and 213e made therein with their phases displaced through 90° From each other, and the other valve body 213' includes a side wall 213'd which has a recessed groove 213'e made therein at such a place that in the assembled state, its phase is displaced through 90°0 from the phase of the recessed groove 213f.

In addition, a recessed groove 234a is also made in the end surface of a drive shaft 234 at such a place that in the assembled state, its phase is displaced through 90°0 from the phase of the recessed groove 213e in the valve body 213.

It is noted that the aforesaid Oldham's coupling 218 for connecting the one valve body 213 with the drive shaft 234 is of the completely same construction as the Oldham's coupling 217.

Now, description will be made of the mode of the connection of the valve body 213 with the valve body 213' and with the drive shaft 234. Between the valve bodies 213 and 213', the first joint member 220 of the Oldham's coupling 217 is tightly fitted with no clearance into the recessed groove 213'e in the valve body 213 and the second joint member 221 is likewise tightly fitted with no clearance into the recessed groove 231f in the valve body 213 to realize the Oldham's connection between the both valve bodies 213 and 213'. In addition, between the valve body 213 and the drive shaft 234, the first joint member 220a of the Oldham's coupling 218 is tightly fitted with no clearance into the recessed groove 213e in the valve body 213 and the second joint member 221a is tightly fitted with no clearance into the recessed groove 234a in the drive shaft 234 to provide an Oldham's connection between both of them.

In this way, the valve body 213 and the valve body 213' as well as the valve body 213 and the drive shaft 234 are connected with each other by the Oldham's couplings 217 and 218 for relative movement in the directions perpendicular to their axial directions to some extent.

In the Oldham's couplings 217 and 218, the first and second joint members 220 and 221; 220a and 221a are movable relative to the third intermediate joint members 222 and 222a, but are unmovable relative to the valve bodies 213 and 213' in which they are fitted and to the drive shaft 234, because they are held in the fixed state with no clearance. Therefore, any clearance is not provided between the recessed grooves 213e, 213f and 213'e in the valve bodies 213 and 213' as well as the recessed groove 234a in the drive shaft 234 and the individual first and second joint members 220 and 221; 220a and 221a, so that in the rotational movement, any shock load cannot be applied on the recessed grooves 213'e, 213f, 213e and 234a in the valve bodies 213 and 213' and the drive shaft 234.

Consequently, the relative displacements in rotational axes between the valve body 213 and the valve body 213' and between the valve body 213 and the drive shaft 234 can be compensated by the movements of the first joint members 220 and 220a and the second joint members 221 and 221a relative to the third intermediate joint members 222 and 222a. Accordingly, even if the valve bodies 213 and 213' are made of a ceramic or the like, it is possible to avoid the arising of the problems of pitching due to shock loads and in its turn, breaking.

What is claimed is:

1. Coupling apparatus for connecting substantially axially aligned members for rotational movement, comprising:
    a joint element attached to each of said members in mutual facing, interlocking relationship;
    said joint elements being substantially perpendicularly disposed with respect to each other and each comprising a substantially rectangularly shaped body containing a substantially rectangularly shaped recess, the recess in each said body being greater in dimension than the joint element body received therein whereby limited relative movement in substantially perpendicular directions is permitted between said joint elements; and
    an engaging member having an engagement hole for reception of said interconnected joint elements, said engagement hole being substantially cruciform in shape and sized to permit said limited relative movement with respect to each said joint element while preventing any substantial angular displacement therebetween, including clearance spaces to permit said limited relative substantially perpendicular movement between said joint elements.

2. The coupling apparatus according to claim 1 in which said coupled members contain oppositely facing, mutually perpendicularly offset recesses for tight reception of said joint elements.

3. The coupling apparatus according to claim 2 in which said coupled members each comprise a rotary valve body.

4. The coupling apparatus according to claim 2 in which said coupled members each comprise a rotary valve body and a drive shaft therefor, respectively.

* * * * *